(12) United States Patent
Tsutsumi et al.

(10) Patent No.: US 6,770,400 B2
(45) Date of Patent: Aug. 3, 2004

(54) NEGATIVE ELECTRODE MATERIAL FOR NONAQUEOUS ELECTROLYTE SECONDARY BATTERY AND METHOD FOR PRODUCING THE SAME

(75) Inventors: Shuji Tsutsumi, Katano (JP); Masaki Hasegawa, Hirakata (JP); Shinji Kasamatsu, Katano (JP); Yoshiaki Nitta, Hirakata (JP); Miho Kayama, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 192 days.

(21) Appl. No.: 10/119,599

(22) Filed: Apr. 10, 2002

(65) Prior Publication Data

US 2002/0182507 A1 Dec. 5, 2002

(30) Foreign Application Priority Data

Apr. 10, 2001 (JP) .................................... 2001-111519
Oct. 29, 2001 (JP) .................................... 2001-330443

(51) Int. Cl.$^7$ .................. H01M 4/58; C01D 15/00; C01B 21/00
(52) U.S. Cl. .................. 429/231.95; 423/351
(58) Field of Search .................. 429/231.9, 231.95; 423/351

(56) References Cited

U.S. PATENT DOCUMENTS 6,410,188 B1 * 6/2002 Shirane et al. ......... 429/231.95

FOREIGN PATENT DOCUMENTS

JP 07-078609 A 3/1995
JP 09-102311 A 4/1997

OTHER PUBLICATIONS

JPO Web site translation of JP 09–102311–A, Apr. 1997.*

* cited by examiner

Primary Examiner—Gregg Cantelmo
(74) Attorney, Agent, or Firm—Akin Gump Strauss Hauer & Feld, L.L.P.

(57) ABSTRACT

A lithium-containing composite nitride with an alkaline metal or an alkaline earth metal added thereto is used as the negative electrode active material, or used as surface layers of core particles of a lithium-containing composite nitride, to provide a negative electrode material for a nonaqueous electrolyte secondary battery with large capacity and high reliability improved in oxidation and decomposition resistance property and thus capacity recovery property after overdischarge.

2 Claims, 7 Drawing Sheets

NEGATIVE ELECTRODE MATERIAL FOR NONAQUEOUS ELECTROLYTE SECONDARY BATTERY AND METHOD FOR PRODUCING THE SAME

BACKGROUND OF THE INVENTION

The present invention relates to an improvement of the oxidation and decomposition resistance property of negative electrode materials for providing nonaqueous electrolyte secondary batteries having large capacity. More particularly, the present invention relates to nonaqueous electrolyte secondary batteries excellent in recovery property from overdischarge.

In recent years, lithium ion batteries using $LiCoO_2$ as the positive electrode and a carbon material as the negative electrode have been widely used as power supplies for portable equipment. With advances in reduction in the size and weight of electronic equipment, these batteries have been requested to have higher energy density, and studies on various materials have been vigorously carried out.

As positive electrode materials for nonaqueous electrolyte secondary batteries, transition metal oxides and chalcogenide compounds such as $LiMn_2O_4$, $LiFeO_2$, $LiNiO_2$, $V_2O_5$, $Cr_2O_5$, $MnO_2$, $TiS_2$ and $MoS_2$, have been proposed so far in addition to $LiCoO_2$.

As negative electrode materials, on the other hand, various materials have been examined and carbon materials have been commercialized and have come into widespread use. However, carbon materials have already achieved a capacity near their theoretical capacity (about 370 mAh/g) and, therefore, a novel negative electrode material having a large capacity is desired.

Here, in JP-A-9-102311, there is proposed the use of a nitride represented by the formula: $A_xM_yN$, wherein A is at least one selected from the group consisting of Na, K, Mg, Ca, Ag, Cu, Zn and Al, M is a transition metal element (M≠A), and 0.0<x and y≦3.0 are met, as a support for a negative electrode active material in order to enhance the energy density of secondary batteries. In accordance with this publication, the element represented by A in the formula can be intercalated/deintercalated into/from the nitride, and moreover lithium ions can be intercalated/deintercalated.

However, the above material does not contain lithium at the time of synthesis thereof. Therefore, to intercalate/deintercalate lithium as a negative electrode active material of a lithium ion battery, it is necessary to deintercalate the element A in the above formula in some way to secure the site for lithium or directly intercalate lithium into a crystal lattice.

It is therefore considered more appropriate to use a composite nitride containing lithium, as proposed in JP-A-7-78609, from the viewpoint of easiness in production of a lithium ion battery, constructional stability during charge/discharge, and reversibility of charge/discharge. The lithium-containing composite nitride proposed in this JP-A-7-78609 is represented by the formula: $Li_aM_bN$, wherein M is a transition metal and a is a variable indicating the content of lithium in the active material varying with charge/discharge, and contains lithium from the beginning which is to be intercalated/deintercalated with charge/discharge. The average operating electrode potential is around 0.8 V with reference to the lithium potential. In addition, the reversible capacity of a battery using this material as the negative electrode is significantly large compared with the case of carbon materials. In other words, this is a promising material for attaining high-capacity batteries.

The present inventors evaluated a battery produced using $LiCoO_2$ as the positive electrode material, in which lithium was electrochemically deintercalated in advance, and a lithium-containing composite nitride as the negative electrode material, which is represented by the formula: $Li_{3-x}M_xN$, wherein M is a transition metal and $0.2 \leq x \leq 0.8$. As a result, although no problem occurs under normal use and ambient conditions, it was found that the battery swells when the battery is in the overdischarged state and generates a gas, and the subsequent recovery is not sufficient. It is noted, herein, that the reaction of the negative electrode active material (that is, the lithium-containing composite nitride) absorbing (intercalating) lithium is referred to as "charge", while the reaction thereof desorbing (deintercalating) lithium is referred to as "discharge".

The mechanism of the gas generation in the overdischarged state is presumed as follows. The lithium-containing composite nitride immediately after the synthesis is in the state of being filled with lithium, unlike carbon materials. This state corresponds to the charged state of a battery using the lithium-containing composite nitride as the negative electrode. Therefore, the lithium-containing composite nitride is lower in stability and thus higher in reactivity when it is in the discharged state with lithium deintercalated than when it is in the initial charged state. This is presumably the reason for the gas generation.

The present inventors analyzed the generated gas and found that nitrogen was the main component. From this fact, it is presumed that this gas is not a gas generated by decomposition of an electrolyte but a gas caused by the lithium-containing composite nitride, that is, a gas generated by decomposition of the lithium-containing composite nitride.

The charge of the lithium-containing composite nitride during discharge is compensated by the valence change of the contained transition metal element as the lithium is being deintercalated from the lithium-containing composite nitride. In this way, presumably, the electric neutrality of the lithium-containing composite nitride is maintained.

However, it is expected that as the amount of lithium to be deintercalated increases, the charge will no more be compensated only by the valence change of the transition metal, and a load will be applied to the nitrogen element. For example, if the composition of the lithium-containing composite nitride is represented by the formula: $Li_{2.6}Co_{0.4}N$, the composition presumably changes to $Li_{1.0}Co_{0.4}N$ when lithium is deintercalated.

On the assumption that, in the initial state of the compound ($Li_{2.6}Co_{0.4}N$), the oxidation numbers of lithium (Li), cobalt (Co) and nitrogen (N) are formally +1, +1 and −3, respectively, and that Co is in charge of the entire charge compensation, the oxidation number of cobalt will become +5 in the discharged state ($Li_{1.0}Co_{0.4}N$). This oxidation number implies a high oxidation state normally inconceivable. In such a state, presumably, nitrogen also participates in the charge compensation by supplying electrons. Therefore, in the overdischarged state in which the nitride is further oxidized, it is presumed that the binding of the nitrogen in the lithium-containing composite nitride becomes very unstable, resulting in decomposition of the nitride.

An object of the present invention is to solve the above problem and to attain a highly reliable battery excellent in recovery property by avoiding the overdischarged state.

BRIEF SUMMARY OF THE INVENTION

To attain the above object, the present invention provides a negative electrode material for a nonaqueous electrolyte secondary battery, comprising a lithium-containing composite nitride represented by the formula (1): $Li_{3-x-y}A_yM_xN$ wherein A is at least one selected from the group consisting of alkaline metals except for lithium and alkaline earth metals, M is a transition metal, $0.2 \leq x \leq 0.8$ and $0.0 < y \leq 0.8$.

Preferably, the negative electrode material comprises core particles made of a lithium-containing composite nitride represented by the formula (2): $Li_{3-x}M_xN$, wherein M is a transition metal and $0.2 \leq x \leq 0.8$, and surface layers made of the lithium-containing composite nitride covering the respective core particles.

Further, the present invention provides a method for producing a negative electrode material for a nonaqueous electrolyte secondary battery, comprising the steps of:

($a_1$) synthesizing core particles made of a lithium-containing composite nitride represented by the formula (2): $Li_{3-x}M_xN$ wherein M is a transition metal and $0.2 \leq x \leq 0.8$;

($b_1$) mixing the core particles with fine powder of a lithium-containing composite nitride represented by the formula (1): $Li_{3-x-y}A_yM_xN$ wherein A is at least one selected from the group consisting of alkaline metals except for lithium and alkaline earth metals, M is a transition metal, $0.2 \leq x \leq 0.8$ and $0.0 < y \leq 0.8$, to give a mixture; and ($c_1$) applying mechanical energy to the mixture to form surface layers made of the lithium-containing composite nitride represented by the formula (1) on the surfaces of the respective core particles by mechanochemical reaction.

Still further, the present invention also provides a method for producing a negative electrode material for a nonaqueous electrolyte secondary battery, comprising the steps of:

($a_2$) synthesizing core particles made of a lithium-containing composite nitride represented by the formula (2): $Li_{3-x}M_xN$, wherein M is a transition metal and $0.2 \leq x \leq 0.8$;

($b_2$) mixing the core particles with at least one selected from the group consisting of alkaline metals except for lithium, alkaline earth metals and nitrides of these alkaline metals and alkaline earth metals to give a mixture; and ($c_2$) re-baking the mixture at 450° C. or more to form surface layers made of the lithium-containing composite nitride represented by the formula (1): $Li_{3-x-y}A_yM_xN$ wherein A is at least one selected from the group consisting of alkaline metals except for lithium and alkaline earth metals, M is a transition metal, $0.2 \leq x \leq 0.8$ and $0.0 < y \leq 0.8$ on the surfaces of the respective core particles.

The present invention also provides a nonaqueous electrolyte secondary battery using a negative electrode material comprising a lithium-containing composite nitride represented by the formula (1):

$$Li_{3-x-y}A_yM_xN$$

wherein A is at least one selected from the group consisting of alkaline metals except for lithium and alkaline earth metals, M is a transition metal, $0.2 \leq x \leq 0.8$ and $0.0 < y \leq 0.8$.

As the alkaline metal, sodium (Na) and potassium (K) are preferably exemplified and, as the alkaline earth metal, magnesium (Mg) and calcium (Ca) are preferably exemplified.

As the transition metal, at least one selected from the group consisting of Co, Cu, Ni, Fe and Mn can be exemplified.

As the nitride of the alkaline metal, preferred is at least one selected from the group consisting of $Na_3N$ and $K_3N$. The present invention also provides a nonaqueous electrolyte secondary battery including a negative electrode using the above negative electrode material, a nonaqueous electrolyte, and a positive electrode capable of intercalating/deintercalating lithium.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 4 is a cross-sectional view of a particle coated with a lithium-containing composite nitride with an alkaline metal added thereto and the like.

Figure 1:
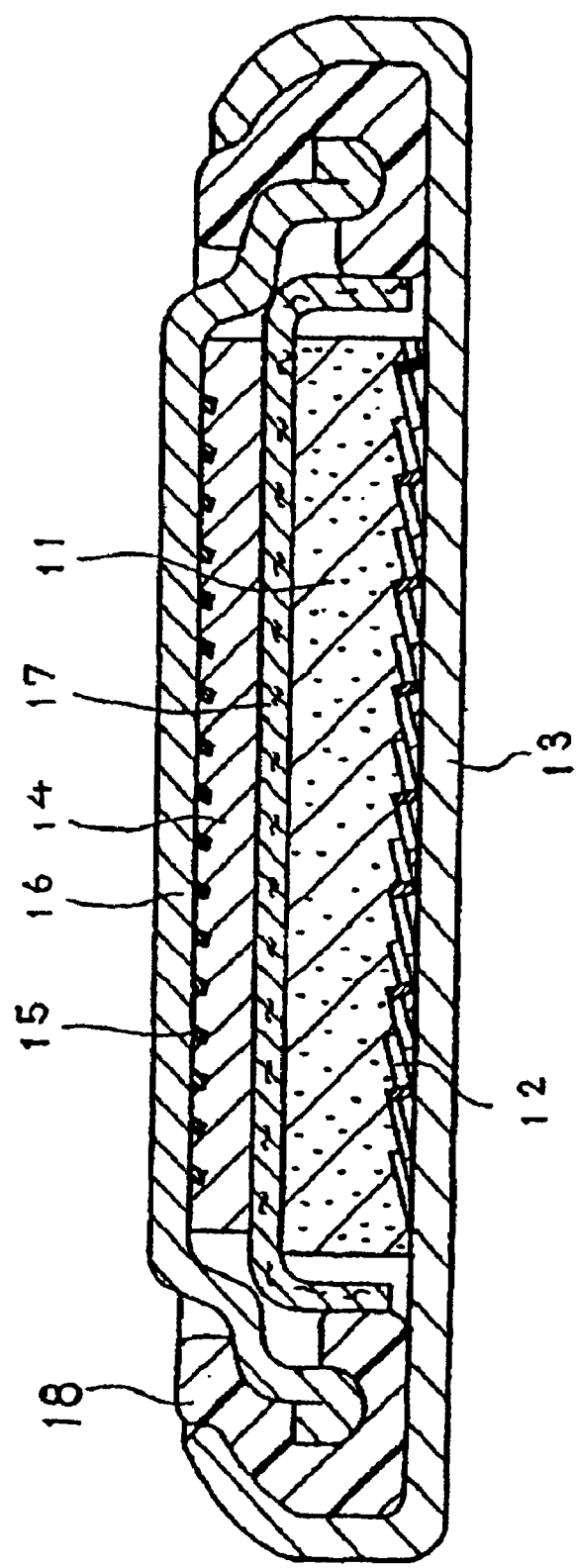
FIG. 1 is a vertical cross-sectional view of a test cell used for evaluation of a negative electrode for a nonaqueous electrolyte secondary battery.

DETAILED DESCRIPTION OF THE INVENTION (Negative Electrode Material)

As discussed above, in order to overcome the prior art problem, it is necessary to suppress oxidation and decomposition of a material in the overdischarged state. Hereinafter, the mechanism of decomposition of a lithium-containing composite nitride represented by the formula: $Li_{3-x}M_xN$, wherein M is a transition metal and x is a real number satisfying $0.2 \leq x \leq 0.8$, in the overdischarged state will be described. Unlike carbon materials, the lithium-containing composite nitride is in the state of being filled with lithium when it has just been synthesized, that is, in the charged state when the lithium-containing composite nitride is used as the negative electrode of a battery. Therefore, lithium has been deintercalated in the discharged state and the balance of the charge is maintained by a valence change of another component element. In a shallowly discharged state, the charge is compensated by the valence change of Co. However, in the deeply discharged state, the charge will no more be compensated only with Co because the amount of Co is small. In this situation, as described in Solid State Ionics, 122 (1999), pp. 85–93, for example, holes are introduced into a 2p electron orbit of a nitrogen atom, and thus nitrogen contributes to the charge compensation. In this way, since the valence change of nitrogen occurs in the deeply discharged state, the binding becomes unstable and thus decomposition occurs. This causes property deterioration due to decomposition in the overdischarged state.

As a result of earnest studies by the present inventors, it has been found that the use of a lithium-containing composite nitride represented by the formula (1): $Li_{3-x-y}A_yM_xN$, wherein A is at least one selected from the group consisting of alkaline metals except for lithium and alkaline earth metals, M is a transition metal, $0.2 \leq x \leq 0.8$ and $0.0 < y \leq 0.8$, as the negative electrode material makes it possible to suppress gas generation due to oxidation and decomposition in the overdischarged state and thus improve the recovery property of the resultant battery. The present invention has been completed based on the findings.

It has also been found that substantially the same effect is obtained by the use of a negative electrode material for a nonaqueous electrolyte secondary battery, comprising core particles made of a lithium-containing composite nitride represented by the formula (2): $Li_{3-x}M_xN$, wherein M is at least one selected from the group consisting of Co, Cu, Ni, Fe and Mn, and $0.2 \leq x \leq 0.8$ and surface layers covering the surfaces of the respective core particles, made of a material capable of suppressing oxidation and decomposition of the core particles, such as the lithium-containing composite nitride represented by the formula (1): $Li_{3-x-y}A_yM_xN$, wherein A is at least one selected from the group consisting of alkaline metals except for lithium and alkaline earth metals, M is a transition metal, $0.2 \leq x \leq 0.8$ and $0.0 < y \leq 0.8$.

In concrete, in the formulae (1) and (2), A is at least one selected from the group consisting of Na, K, Mg and Ca, and M is at least one selected from the group consisting of Co, Cu, Ni, Fe and Mn.

The lithium-containing composite nitride represented by the formula (1) is synthesized with a composition having lithium as a major component and has a large capacity and excellent charge/discharge reversibility and oxidation and decomposition resistance property and, therefore, the prior art problem described above can be solved.

When lithium is released from the lithium-containing composite nitride with the discharge of the battery, the charge is probably compensated by the valence change of the transition metal basically. In the end of the discharge, however, it is presumed that nitrogen, which forms a hybridized orbital together with a transition metal, also contributes to the charge compensation to disturb the charge balance and cause instability of the composite nitrogen compound.

The potential of the negative electrode material made of the lithium-containing composite nitride described above was actually scanned into a higher range beyond a certain potential belonging to an overdischarge range unused in the normal charge/discharge cycles. As a result, it was found that part of the negative electrode material decomposed and generated nitrogen gas. The reason of the deterioration of the battery in capacity recovery property after overdischarge is considered as follows. That is because, when overdischarge occurs, the potential at the negative electrode reaches the decomposition potential range, a part of the lithium-containing composite nitride is decomposed to generate gas and decrease the amount of the negative electrode material, the electrolyte is kept away from the periphery of the negative electrode material due to the gas and, thus, the reaction between the positive electrode and the negative electrode is blocked by the existence of the gas therebetween.

The behavior of the electrode potential during battery discharge was further examined in detail and it was found that when the difference between the open-circuit voltage and the close-circuit voltage, that is, the overpotential sharply increases in the end of discharge and the close-circuit voltage reaches the decomposition potential range after overdischarge, the gas is generated. The reason of the increase in overpotential is not known, but presumed that the electron conductivity decreases at the end of discharge on the surface of the negative electrode material, on which the charge transfer process of the electrode reaction takes place.

In view of the above, the present inventors have focused attention on suppressing the increase in overpotential by improving the electron conductivity at the end of discharge to solve the above problem.

It has been found that the recovery property after overdischarge improves in particular when at least one selected from the group consisting of Na and K is added as the alkaline metal in the lithium-containing composite nitride represented by the formula (1). The reason is not known but presumed as follows.

The ionization energies of lithium (Li), sodium (Na) and potassium (K) are 520 kJ/mol, 496 kJ/mol and 419 kJ/mol, respectively (Li>Na>K). That is, Na and K are more ionizable and release electrons more easily than Li.

Therefore, Na and K added to the lithium-containing composite nitride are not absorbed/desorbed during charge/discharge as Li are done, but presumably become donors of electrons at the end of discharge, serving to suppress the reduction in electron conductivity and the increase in overpotential, prevent the electrode potential from reaching the decomposition range in the overdischarged state, and thus suppress oxidation and decomposition of the lithium-containing composite nitride. In addition, presumably, Na and K become electron donors and are involved in the charge compensation, thereby preventing the transition metal from being in a highly oxidized state, preventing electrons from being drawn from nitrogen forming a hybridized orbital together with a transition metal, and thus contributing to stabilization of the charge balance. As a result, the stability of the lithium-containing composite nitride presumably improves.

It has also been found that the recovery property particularly after overdischarge improves when at least one selected from the group consisting of magnesium (Mg) and calcium (Ca) as the alkaline earth metal is added in the lithium-containing composite nitride represented by the formula (1). The reason is as follows. When an alkaline earth metal such as Mg and Ca substitutes for part of Li, the introduction of a hole into the 2p orbital of a nitrogen atom during discharge can be prevented because the alkaline earth metal has an oxidation number of 2 and a high electron donation property compared with Li having an oxidation number of 1. Thus, instability in the discharged state is reduced, and decomposition is suppressed.

When A in the formula (1): $Li_{3-x-y}A_yM_xN$ is an alkaline metal except for lithium, the added amount y of A is preferably in a range of $0.0<y\leq0.8$. The effect of suppressing the oxidation and decomposition is attained with addition of at least one selected from the group consisting of Na and K as the alkali element A as described above. However, if y exceeds 0.8, the alkali element is not completely incorporated in the nitride, but an impurity phase is generated. It is more preferable that $0.01<y\leq0.6$ may be met. Na and K may be added singly, or both may be added.

When A in formula (1): $Li_{3-x-y}A_yM_xN$ is an alkaline earth metal, the added amount y of A is preferably in a range of $0.0<y\leq0.2$. Decomposition during discharge is suppressed with addition of at least one selected from the group consisting of Mg and Ca as the element A. However, in the case of y>0.2, the alkaline earth metal is not completely incorporated and an impurity phase is generated. The alkaline earth metal will be completely incorporated to form a single phase in case of $y\leq1.0$. It is more preferable that $0.01<y\leq0.1$ is met. On the other hand, as for the amount of x, $0.2\leq x\leq0.8$ may be satisfied.

As the transition metal M, at least one selected from the group consisting of Co, Cu, Ni, Fe and Mn is preferably used. By the use of any of these elements as the transition metal M, it is possible to obtain a material having a layered hexagonal crystal structure, which provides especially excellent properties. Since the electron conductivity becomes insufficient in case of x<0.2 and the capacity decreases failing to provide acceptable properties in case of x>0.8, it is preferable to meet $0.2\leq x\leq0.8$, more preferably $0.3\leq x\leq0.5$.

The negative electrode material of the present invention may have a surface layer made of a material represented by the formula (1). In this case, it is preferable that the lithium-containing composite nitride represented by the formula (2): $Li_{3-x}M_xN$, wherein M is a transition metal and $0.2\leq x\leq0.8$ is used for the core particle (nucleus), and a surface layer made of a nitride represented by the formula (1) having the effect of suppressing oxidation and decomposition of the lithium-containing composite nitride represented by the formula (2) is provided on the core particle.

Among others, the surface layer is preferably made of a lithium-containing composite nitride represented by the formula (1): $Li_{3-x-y}A_yM_xN$, wherein A is at least one selected from the group consisting of alkaline metals except for lithium and alkaline earth metals, M is a transition metal, $0.2\leq x\leq0.8$ and $0.0\leq y\leq0.8$, in which A is preferably at least one selected from the group consisting of Na and K. The ranges of x and y in this case may differ with the type of A as described above.

For example, if an alkali element is added, the effect of suppressing oxidation and decomposition is exhibited. In this case, if y exceeds 0.8, the alkaline metal fails to be completely incorporated in the nitride, but an impurity phase is generated. Therefore, it is preferable that $0.01<y\leq0.6$ is met.

A lithium-containing composite nitride with an alkaline metal or an alkaline earth metal added thereto has a sufficiently large capacity compared with the carbon materials currently used as the negative electrode materials of lithium ion batteries. However, the capacity slightly decreases after the above addition compared with the non-added lithium-containing composite nitride. In view of this, a lithium-containing composite nitride represented by the formula (2): $Li_{3-x}M_xN$, wherein M is a transition metal and $0.2\leq x\leq0.8$, is used for core particles, and the core particles are coated with surface layers made of a lithium-containing composite nitride represented by the formula (1): $Li_{3-x-y}A_yM_xN$, wherein A is at least one selected from the group consisting of alkaline metals except for lithium and alkaline earth metals, M is a transition metal, $0.2\leq x\leq0.8$ and $0.0<y\leq0.8$, excellent in oxidation resistance property. The resultant negative electrode material has great effects of providing a large capacity and being excellent in oxidation and decomposition resistance property.

The lithium-containing composite nitride represented by the formula (2): $Li_{3-x}M_xN$, wherein M is a transition metal and $0.2\leq x\leq0.8$, constituting the core particles can be obtained by substituting a transition metal M for part of lithium in lithium nitride ($Li_3N$). As the transition metal M, it is preferable to use Cu, Fe, Mn, Co, Ni and the like in particular from the viewpoint of realizing a large-capacity lithium-containing composite nitride excellent in charge/discharge reversibility.

The lithium-containing composite nitride may contain only one type of transition metal or two or more types of transition metals. The composition such as the type of the transition metal or the substitution amount thereof may differ between the surface layers and the core particles. Among others, a lithium-containing composite nitride containing cobalt as the transition metal M represented by the formula: $Li_{3-x}Co_xN$ exhibits especially excellent charge/discharge reversibility. If x is less than 0.2, the conductivity in the negative electrode is insufficient. If x exceeds 0.8, the capacity of the negative electrode is insufficient.

The method for coating the surfaces of the core particles to provide the surface layers is not specifically limited. For example, after synthesizing a lithium-containing composite nitride in advance to obtain core particles, mechanical energy is applied to a mixture of the core particles and fine powder of a material to constitute desired surface layers, so that the surfaces of the core particles are fused and alloyed to form surface layers. Such a method utilizing mechanochemical reaction may be employed. As the specific methods utilizing mechanochemical reaction, there are exemplified a hybridization method, a mechano-fusion method, a theta composer method, a mechano-mill method, a ball mill method and the like.

Alternatively, after a lithium-containing composite nitride for core particles is synthesized in advance, the core particles are mixed with an alkaline metal A (preferably, at least one selected from the group consisting of Na and K) or a nitride thereof (preferably, $Na_3N$ or $K_3N$), and the resultant mixture is re-baked at 450° C. or more. If the re-baking temperature is less than 450° C., the incorporation (solid solution) reaction of the alkaline metal does not proceeds sufficiently.

The boundary between the surface layer and the core particle may be clear but, more preferably, the composition may continuously and gradually change (tilt) from the surface layer to the core particle.

By employing any of the coating method described above, it is possible to synthesize a negative electrode material in which the composition continuously changes, that is, the size of crystal lattice continuously changes.

With the above continuously changing composition, discontinuity of a conduction route of lithium ions is eliminated, and thus diffusion of lithium ions in the solid phase is less blocked. This results in reduction in polarization and thus, expectedly, improvement in oxidation resistance property and battery charge/discharge characteristics.

When the surface layers are formed for the negative electrode material of the present invention by the method described above, the formation is preferably made in an atmosphere of high-purity nitrogen gas, argon gas or the like with water or oxygen contained as little as possible. This is because lithium is highly reactive with water and thus deteriorates with water, and also the resultant negative electrode material must be prevented from oxidation. In particular, when the surface layers are formed by re-baking, the atmosphere of high-purity nitrogen gas is more preferable.

The thickness of the surface layer in the negative electrode material of the present invention is preferably 0.01 $\mu$m or more, more preferably 0.1 $\mu$m or more. If the thickness is less than 0.01 $\mu$m, the effect of suppressing oxidation and decomposition of the lithium-containing composite nitride decreases.

However, the thickness is not specifically limited if the surface layer is made of a lithium-containing composite nitride with an alkaline metal added thereto, as represented by the formula (1). When more improvement in stability is desired, the surface layer may be thickened. When more improvement in capacity is desired, the surface layer may be thinned to a minimum. In other words, an arbitrary thickness may be adopted depending on the intended battery properties.

The coating proportion of the core particle with the surface layer may be 20% or more of the entire surface area from the viewpoint of sufficiently exhibiting the effect of suppressing oxidation and decomposition. The proportion is more preferably 80% or more and, most preferably, the surface layer is formed over the entire surface of the core particle.

The thickness of the surface layer and the coating proportion can be measured by an electron spectroscopy for chemical analysis (ESCA), an electron probe microanalysis (EPMA), a scanning electron microscopy (SEM) or the like.

A negative electrode can be produced using the negative electrode material made of a nitride less prone to oxidation and decomposition represented by the formula (1) described above, or the negative electrode material having surface layers made of the above nitride and core particles made of a lithium-containing composite nitride described above. Using the resultant negative electrode, a nonaqueous electrolyte secondary battery can be produced.

(Nonaqueous Electrolyte Secondary Battery)

The negative electrode mixture may contain a binder in addition to the above negative electrode material (active material) and a conductive material. As the binder, one used for a conventional negative electrode mixture of the nonaqueous electrolyte secondary batteries may be used. For example, polyvinylidene fluoride, styrene-butadiene rubber, polyvinylidene difluoride or the like may be used.

To obtain the negative electrode mixture, the active material, the conductive material and binder are mixed. If the kneading is carried out with the addition of a solvent at that time, a homogeneously mixed mixture in the form of paste can be obtained. By applying the resultant paste onto a current collector such as a metal foil and roll-processing the applied foil to have a desired shape, an electrode can be obtained.

As the solvent to be used here, it is desirable to use highly dehydrated one. This is because the lithium-containing composite nitride contained in the negative electrode is highly reactive to water content and deteriorates with water content. For example, an organic solvent such as dehydrated toluene is preferably used.

The obtained negative electrode may be combined with a positive electrode, which is not limited in particular, comprising a material capable of absorbing and desorbing lithium ions such as a lithium-containing composite nitride including lithium cobaltate and lithium nickelate to constitute a nonaqueous electrolyte secondary battery through an ordinary production method.

In the present invention, there is no limitation on the electronically conductive materials for the negative electrode if it has electron conductivity. For instance, there are graphites such as natural graphite (scaly graphite and the like), artificial graphite and expanded graphite, carbon blacks such as acetylene black, ketjen black, channel black, furnace black, lamp black and thermal black, conductive fibers such as carbon fiber and metal fiber, metallic powders of cupper and nickel, organic conductive materials such as polyphenylene derivatives, and they can be used alone or an in arbitrary combination of one or more. Among the artificial graphites, acetylene black and carbon fibers are particularly preferable.

The amount of the conductive material to be added is not specifically limited but preferably 1 to 50% by weight of the negative electrode material, particularly 1 to 30% by weight. Since the negative electrode material in accordance with the present invention itself has electron conductivity, it is possible to operate a battery without adding a conductive material.

The binder for the negative electrode used in the present invention may be either of a thermoplastic resin or a thermosetting resin. As the preferable binder in the present invention, there are polyethylene, polypropylene, polytetrafluoroethylene (PTFE), polyvinylidene fluoride (PVDF), styrene butadiene rubber, tetrafluoroethylene-hexafluoroethylene copolymer, tetrafluoroethylene-hexafluoropropylene copolymer (FEP), tetrafluoroethylene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer and ion ($Na^+$) cross-linked polymer thereof, ethylene-methacrylic acid copolymer and ion ($Na^+$) cross-linked polymer thereof, ethylene-methyl acrylate copolymer and ion ($Na^+$) cross-linked polymer thereof, ethylene-methyl methacrylate copolymer and ion ($Na^+$) cross-linked polymer thereof, and they can be used alone or in arbitrary combination of one or more.

Among the preferable binders are styrene butadiene rubber, polyvinylidene fluoride, ethylene-acrylic acid copolymer and ion ($Na^+$) cross-linked polymer thereof, ethylene-methacrylic acid copolymer and ion ($Na^+$) cross-linked polymer thereof, ethylene-methyl acrylate copolymer and ion ($Na^+$) cross-linked polymer thereof, and ethylene-methyl methacrylate copolymer and ion ($Na^+$) cross-linked polymer thereof.

As for the current collector of the negative electrode in the present invention, any electron conductor, which does not cause a chemical change in a constructed battery may be used. As for the material constituting the current collector for the negative electrode, there are, for instance, in addition to stainless steel, nickel, copper, titanium, conductive resin and the like, the composite materials which are obtained by treating the surface of copper or stainless steel with carbon, nickel or titanium. In particular, copper or copper alloy is preferable.

The surfaces of those materials may be oxidized to be used. And the surface of these materials may be made concave and convex through the surface treatment.

As for a form, a foil, a film, a sheet, a net, a punched sheet, a lath, a porous sheet, a foam, a molded article formed by molding fibers or the like may be employed. Though the thickness is not particularly limited, one having 1 to 500 $\mu$m is employed.

As for the positive electrode material, lithium-contained transition metal oxides may be employed. For instance, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (M is at least one of Na, Mg, Sc, Y, Mn, Fe, Co, Ni, Cu, Zn, Al, Cr, Pb, Sb and B, x=0 to 1.2, y=0 to 0.9, z=2.0 to 2.3) can be exemplified.

The value of x in the above is a value before charging or discharging, which increases or decreases after the charging or discharging. It is also possible to use other positive electrode materials such as a transitional metal chalcogenide, vanadium oxide and the lithium compound thereof, niobium oxide and the lithium compound thereof, a conjugate polymer using an organic conductive material, a Chevrel phase compound. In addition, it is also possible to use a mixture of a plurality of different positive electrode materials. Though the mean particle size of the positive electrode active material particle is not particularly limited, it is preferable to be 1 to 30 $\mu$m.

The conductive material used for the positive electrode used in the present invention is not limited if it does not cause any chemical change at a charge/discharge potential of a positive electrode material to be used. For instance, there are graphite such as natural graphite (scaly graphite and the like) and artificial graphite, carbon blacks such as acetylene black, ketjen black, channel black, furnace black, lamp black and thermal black, conductive fibers such as carbon fiber and metal fiber, metallic powders of fluorinated carbon, aluminum and the like, conductive wiskers of zinc oxide, potassium titanate and the like, conductive metal oxides such as titanium oxide, and organic conductive material such as poluphenylene derivatives, and they can be used alone or in an arbitrary combination of one or more. Among those conductive materials, artificial graphite and acetylene black are particularly preferable.

The amount of the conductive material to be added is not particularly limited but is preferably 1 to 50% by weight, more preferably 1 to 30% by weight of the positive electrode material. When carbon or graphite is employed, 2 to 15% by weight is particularly preferable.

As the binder for the positive electrode used in the present invention, either of a thermoplastic resin or a thermosetting resin may be used. As the preferable binder in the present invention, there are polyethylene, polypropylene, polytetrafluoroethylene (PTFE), polyvinylidene fluoride (PVDF), styrenebutadiene rubber, tetrafluoroethylene-hexafluoroethylene copolymer, tetrafluoroethylene-hexafluoropropylene copolymer (FEP), tetrafluoroethylene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer or ion ($Na^+$) cross-linked polymer thereof, ethylene-methacrylic acid copolymer or ion ($Na^+$) cross-linked polymer thereof, ethylene-methyl acrylate copolymer or ion ($Na^+$) cross-linked polymer thereof, ethylene-methyl methacrylate copolymer or ion (Na+) cross-linked polymer thereof, and they can be used alone or in an arbitrary combination of one or more. More preferable materials among those materials are polyvinylidene fluoride (PVDF) and polytetrafluoroethylene (PTFE).

As for the current collector for the positive electrode used in the present invention, there is no particular limitation, and any electron conductor, which does not cause a chemical change at a charge/discharge potential of the positive electrode material to be used, can be employed. As the material for constituting the current collector for the positive electrode, there are, in addition to stainless steel, aluminum, titanium, carbon, conductive resin and the like, the materials obtained by treating the surfaces of aluminum or stainless steel with carbon or titanium. In particular, aluminum or aluminum alloy is preferable. The surfaces of those materials may be oxidized to be used. The surface of the current collector is preferably made convex and concave. As for a form, a foil, a film, a sheet, a net, a punched sheet, a lath, a porous sheet, a foam, a molded article formed by molding fibers, non-woven fabric or the like can be listed. Though the thickness is not particularly limited, one having 1 to 500 $\mu$m is used.

As for the electrode mixture, in addition to a conductive material and a binder, a variety of additives such as a filler, a dispersion agent, an ion conductor, a pressure enforcement agent and the like can be used. Any fibrous materials, which do not cause a chemical change in the constructed battery, can be used as fillers. Usually, olefin polymer such as polypropylene or polyethylene, or a fiber such as glass fiber or carbon fiber may be used. Though the amount of the filler to be added is not particularly limited, 0 to 30% by weight of the electrode mixture is preferable. As for the structure of the negative electrode plate and the positive electrode plate in the present invention, it is preferable that at least the surface of a mixture layer of the positive electrode exists facing the surface of the mixture layer of the negative electrode.

The non-aqueous electrolyte used in the present invention comprises a solvent and a lithium salt dissolved in the solvent. As for the non-aqueous solvent, there are cyclic carbonates such as ethylene carbonate (EC), propylene carbonate (PC), butylene carbonate (BC) and vinylene carbonate (VC), chain carbonates such as dimethyl carbonate (DMC), diethyl carbonate (DEC), ethyl-methyl carbonate (EMC) and dipropyl carbonate (DPC), aliphatic carboxylic acid esters such as methyl formate, methyl acetate, methyl propionate and ethyl propionate, $\gamma$-lactones such as $\gamma$-butyrolactone, chain ethers such as 1,2-dimethoxy ethane (DME), 1,2-diethoxy ethane (DEE) and ethoxy-methoxy ethane (EME), cyclic ethers such as tetrahydrofuran and 2-methyl tetrahydrofuran, non protonic organic solvents such as dimethyl sulfoxide, 1,3-dioxolane, formamide, acetoamide, dimethyl formamide, dioxolane, acetonitrile, propylnitrile, nitromethane, ethylmonogrime, phosphoric acid triester, trimethoxy methane, dioxolane derivatives, sulfolane, methylsulfolane, 1,3-dimethyl-2-imidazolidinone, 3-methyl-2-oxazolidinone, propylene carbonate derivatives, tetrahydofuran derivatives, ethyl ether, 1,3-propanesalton, anisole, dimethylsulfoxide and N-methylpyrolidone, and they can be used alone or in an arbitrary combination of one or more. Particularly, a mixture solvent of a cyclic carbonate and a chain carbonate, or a mixture solvent of a cyclic carbonate, a chain carbonate and an aliphatic carboxylic acid ester are preferable.

As for the lithium salt dissolved in those solvents, there are $LiClO_4$, $LiBF_4$, $LiPF_6$, $LiAlCl_4$, $LiSbF_6$, LiSCN, LiCl, $LiCF_3SO_3$, $LiCF_3CO_3$, $Li(CF_3SO_2)_2$, $LiAsF_6$, $LiN(CF_3SO_2)_2$, $LiB_{10}$, lithium lower aliphatic carboxylate, LiCl, LiBr, LiI, chloroboranlithium, lithium tetraphenyl borate and imidos, and they can be used alone or in an arbitrary combination of two or more. In particular it is preferable to add $LiPF_6$.

The particularly preferable nonaqueous electrolyte in the present invention is an electrolyte comprising at least ethylene carbonate and ethyl methyl carbonate and, as the lithium salt, $LiPF_6$.

The amount of the electrolyte to be added in the battery is not particularly limited and may be selected based on the amounts of the positive electrode material and the negative electrode material, the size of the battery and the like. Though the amount of the lithium salt to be dissolved in the non-aqueous solvent is not particularly limited, 0.2 to 2 mol/l is preferable. Particularly, it is more preferable to be 0.5 to 1.5 mol/l.

Furthermore, for the purpose of improving the discharge capacity and the charge/discharge characteristics, it is effective to add other compounds to the electrolyte. For example, triethylphosphite, triethanolamine, cyclic ethers, ethylenediamine, n-grime, pyridine, hexaphosphate triamide, nitrobenzene derivatives, crown ethers, the fourth ammonium salts, ethylene glycol-dialkyl ether and the like can be cited.

As for the separator used in the present invention, a micro-porous film having large ion permeability, a predetermined mechanical strength and an insulating property is used. It is also preferable to have a function to close a pore at a certain temperature or higher so as to increase the resistance. From the viewpoint of the chemical resistance against organic solvent and hydrophobic property, a sheet a non-woven fabric or a woven fabric composed of an olefin polymer such as polypropylene, polyethylene or the mixture thereof, or glass fibers, or the like may be used.

The pore diameter of the separator is preferably in the range where the positive and negative electrode materials, the binder and the conductive material, which have desorbed from the electrode sheets, do not permeate, and it is desirable to be, for example, in a range of 0.01 to 1 μm. As for the thickness of the separator, 10 to 300 μm is generally used. And the vacancy ratio is determined in accordance with the permeability of electrons and ions, materials, an osmotic pressure and the like, and generally 30 to 80% is preferable.

It is also possible to constitute a battery in which a polymer material absorbing and retaining an organic electrolyte comprising a solvent and a lithium salt dissolved therein is held in a positive electrode mixture and a negative electrode mixture and, further, a porous separator composed of a polymer absorbing and retaining an organic electrolyte is integrated with a positive electrode and a negative electrode, respectively.

Any forms of the batteries are applicable such as a coin type, a button type, a sheet type, a stacked type, a cylindrical type, a flat type, a rectangular type, a large type used for electric vehicles or the like.

A non-aqueous electrolyte secondary battery in accordance with the present invention can be used for a portable information terminal, a portable electronic appliances, a home use compact power storage device, a motor bike, an electric vehicle, a hybrid electric vehicle or the like, but is not particularly limited thereto.

The present invention is described in further detail in accordance with the following examples. The present invention is not limited to those examples.

EXAMPLES 1 TO 5 AND COMPARATIVE EXAMPLES 1 AND 2

The overdischarge recovery property was compared among lithium-containing composite nitrides with an alkaline metal in varying added amounts. First, lithium-containing composite nitrides in accordance with the present invention were synthesized in the following manner. In these examples, cobalt (Co) was used as the transition metal. Synthesis was also possible using any of the other transition metals specified hereinbefore.

As the starting materials, powder of lithium nitride ($Li_3N$), Co powder and powder of sodium nitride ($Na_3N$) were used. Seven different mixtures were prepared by mixing $Li_3N$ powder, $Na_3N$ powder and Co powder sufficiently so that the Li/Na/Co ratios were 2.60:0.00:0.40 (Comparative Example 1), 2.595:0.005:0.4 (Example 1), 2.59:0.01:0.4 (Example 2), 2.5:0.1:0.4 (Example 3), 2.0:0.6:0.4 (Example 4), 1.8:0.8:0.4 (Example 5) and 1.6:1.0:0.4 (Comparative Example 2).

Each of the above mixtures was put in a crucible and baked in a high-purity (99.9% or more) nitrogen atmosphere at 700° C. for eight hours, to obtain lithium-containing composite nitride powders (negative electrode materials) represented by $Li_{2.60}Co_{0.4}N$ (Comparative Example 1), $Li_{2.595}Na_{0.005}Co_{0.4}N$ (Example 1), $Li_{2.59}Na_{0.01}Co_{0.4}N$ (Example 2), $Li_{2.5}Na_{0.01}Co_{0.4}N$ (Example 3), $Li_{2.0}Na_{0.6}Co_{0.4}N$ (Example 4), $Li_{1.8}Na_{0.8}Co_{0.4}N$ (Example 5) and $Li_{1.6}Na_{1.0}Co_{0.4}N$ (Comparative Example 2).

The synthesis was performed in a high-purity nitrogen atmosphere (oxygen concentration: 100 ppm or less) with a low humidity (dew point: −20° C. or less). The resultant lithium-containing composite nitride powders were subjected to powder X-ray diffraction measurement, and found that a peak presumably due to an impurity phase was recognized only in $Li_{1.6}Na_{1.0}Co_{0.4}N$ (Comparative Example 2), indicating failure in providing a uniform solid solution. As for the other powders, the same hexagonal pattern as that observed in lithium nitride ($Li_3N$) was observed and no impurity peak was recognized.

Synthesis cases other than the above case that the substitution amount of the transition metal x was 0.4 and that Co was used singly as the transition metal were also examined. As a result, an impurity phase was generated in any of cases in which the substitution amount y of Na exceeded 0.8.

Coin-type test cells shown in FIG. 1 were produced using the negative electrode materials prepared as described above, and the electrochemical properties such as the recovery characteristics after overdischarge were evaluated.

The test cell shown in FIG. 1 includes a test electrode 11, a current collector 12, a case 13, lithium foil 14, a current collector 15, a sealing plate 16, a separator 17 and a gasket 18.

More specifically, the lithium-containing composite nitride powder synthesized as described above was mixed with artificial graphite (KS-6) as a conductive material and styrene-butadiene rubber as a binder at a predetermined ratio, and the mixture was dispersed in dehydrated toluene to obtain negative electrode mixture slurry. The negative electrode mixture slurry was applied to copper foil (thickness: 14 $\mu$m) as the negative electrode current collector with a doctor blade, and then dried at 80° C. under a reduced pressure. The resultant current collector was rolled with rollers to obtain a negative electrode sheet. A disc-shaped negative electrode having a diameter of 15 mm was punched out from the negative electrode sheet.

On the other hand, positive electrode mixture slurry was obtained in the following manner. $LiCoO_2$ powder, carbon powder as a conductive material, and polyvinylidene fluoride resin as a binder were mixed at a weight ratio of 90:7:3, and the obtained mixture was dispersed in dehydrated n-methyl-2-pyrrolidinone to obtain a positive electrode mixture in the form of slurry. The positive electrode mixture was applied to aluminum foil (thickness: 20 $\mu$m) as the positive electrode current collector by means of a doctor blade, dried, and then rolled with two rollers to obtain a positive electrode sheet. A disc-shaped positive electrode having a diameter of 14 mm was cut off from the positive electrode sheet.

Using the resultant positive electrode disc, a coin cell was produced together with a counter electrode comprising a lithium metal and charged. The charged cell was then disassembled to form a positive electrode from which lithium has been electrochemically deintercalated.

Each of the test cells produced as described above were subjected to charge/discharge for 10 cycles at a current density of 0.65 mA/cm$^2$ and a voltage range of 2.3 to 4.0 V, and then discharged to 0 V and left to stand for one day. Thereafter, the test cell was charged again to 4.0 V and then discharged to 2.3 V. The ratio of the discharge capacity obtained at this discharge to the discharge capacity obtained at the discharge to 2.3 V in the tenth cycle was calculated as a capacity recovery rate. The results are shown in Table 1.

TABLE 1

| Negative electrode material | y | Capacity recovery rate (%) | Thickness before overdischarge (mm) | Thickness after overdisoharge (mm) |
| --- | --- | --- | --- | --- |
| Ex. 1 | 0.005 | 65 | 1.61 | 1.80 |
| Ex. 2 | 0.01 | 71 | 1.61 | 1.68 |
| Ex. 3 | 0.1 | 80 | 1.60 | 1.65 |
| Ex. 4 | 0.6 | 83 | 1.61 | 1.66 |
| Ex. 5 | 0.8 | 78 | 1.60 | 1.70 |
| Com. Ex. 1 | 0.0 | 42 | 1.60 | 2.20 |
| Com. Ex. 2 | 1.0 | 58 | 1.60 | 1.85 |

As is found from Table 1, when the negative electrode materials of the present invention are used, the cells exhibited less swelling due to gas generation after overdischarge and were excellent in capacity recovery rate, compared with Comparative Example 1 in which no alkaline metal was added. Model cells were produced to examine the negative electrode potentials after overdischarge. As a result, while the negative electrode potential reached 2.4 V with respect to lithium in Comparative Example 1, it was below 2.0 V in all of Examples 1 to 5, exhibiting the effect obtained by adding an alkaline metal. Cases of using K or both Na and K as the alkaline metal were also examined, and found that the capacity recovery rate after overdischarge improved as in Example 1.

EXAMPLES 6 TO 10 AND COMPARATIVE EXAMPLE 3

The overdischarge recovery property was compared among negative electrode materials including core particles coated with lithium-containing composite nitrides with an alkaline metal in varying added amounts and that including uncoated core particles.

Surface layers made of five types of alkaline metal-substituted lithium-containing composite nitrides represented by the formula (1), which were synthesized as in Examples 1 to 5, were formed on core particles of a lithium-containing composite nitride $Li_{2.6}Co_{0.4}N$ by a mechano-fusion method using a compressed grinding type pulverizer.

Figure 2:
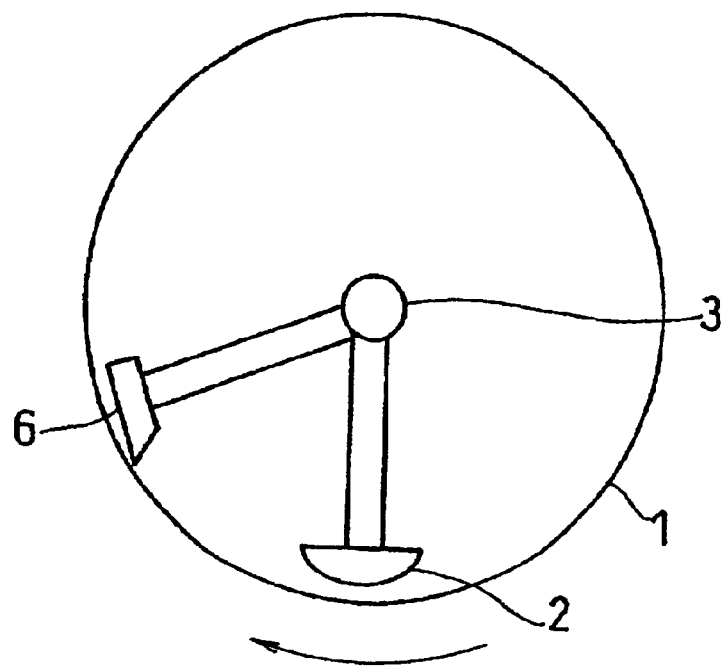
FIG. 2 is a diagrammatic vertical cross-sectional view of a mechanism of a compressed grinding type pulverizer used for coating in examples of the present invention.
Figure 3:
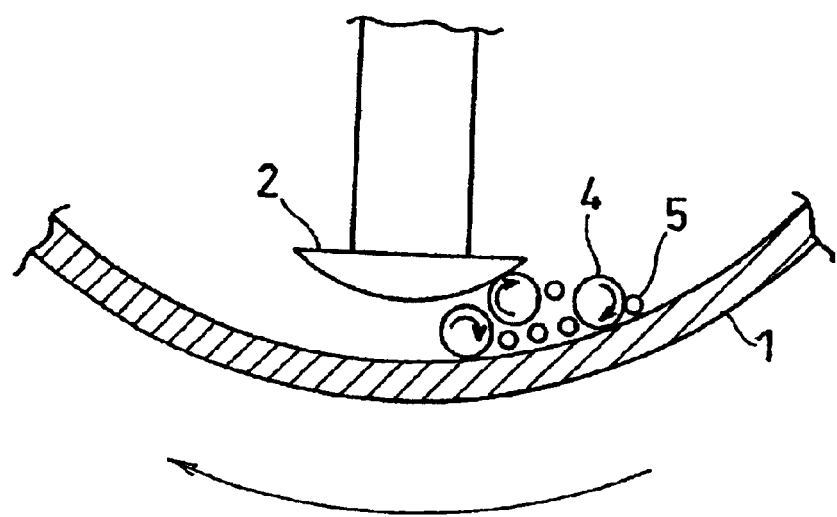
FIG. 3 is a diagrammatic view of the state of compression and grinding by the compressed grinding type pulverizer of FIG. 2.

A schematic partial illustration of the compressed grinding type pulverizer used in these examples was shown in FIG. 2. Also, a diagrammatic illustration of the state of the compression and grinding working on particles in the pulverizer was shown in FIG. 3.

The coating mechanism of the pulverizer will be described briefly. A cylindrical case 1 rotates around a fixed axis 3 at high speed and, due to centrifugal force generated by this rotation, a mixture of lithium-containing composite nitride particles (mother particles) to be core particles and alkaline metal-substituted lithium-containing composite nitride particles (child particles) to be surface layers is pressed against the inner wall of the case 1. Simultaneously, a work member 2 secured to the fixed axis 3 exerts a pressing force on the mixture pressed against the case 1. With this force, the child particles are pressed and drawn over the surfaces of the mother particles and thus cover the mother particles.

Figure 4:
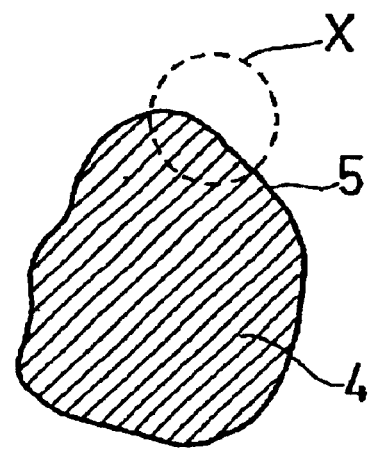
Figure 5:
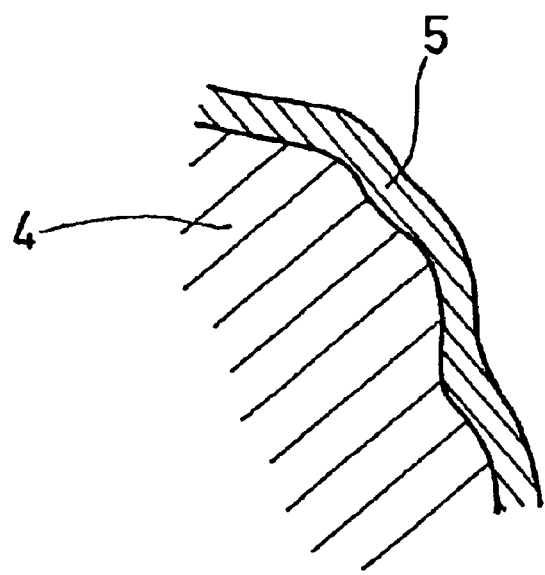
FIG. 5 is an enlarged view of portion X of FIG. 4.

A scraper 6 scrapes the mixture from the inner wall of the case 1 and stirs and mixes the mixture. This facilitates the coating of the mother particles with the child particles. FIG. 4 diagrammatically illustrates the cross section of a coated particle, that is a core particle 4 together with a surface layer 5. FIG. 5 is an enlarged view of portion X of FIG. 4.

By the coating method described above, samples were obtained in which the surfaces of the core particles of a lithium-containing composite nitride were coated with an alkaline metal-substituted lithium-containing composite nitride. The coating conditions could be appropriately set but, in these examples, 180 g of $Li_{2.6}Co_{0.4}N$ as the lithium-containing composite nitride used as the core particles and 20 g of each alkaline metal-substituted lithium-containing composite nitrides having the compositions described above were put in the pulverizer and processed at a rotational speed of 1800 rpm for 10 minutes. The distance of the work member 2 secured to the fixed axis 3 from the inner wall of the case 1 was set to 3 mm at the closest position.

As a result, obtained were a negative electrode material having a surface layer made of the lithium-containing composite nitride represented by $Li_{2.595}Na_{0.005}Co_{0.4}N$ (Example 6), a negative electrode material having a surface layer made of the lithium-containing composite nitride represented by $Li_{2.59}Na_{0.01}Co_{0.4}N$ (Example 7), a negative electrode material having a surface layer made of the lithium-containing composite nitride represented by $Li_{2.5}Na_{0.1}Co_{0.4}N$ (Example 8), a negative electrode material having a surface layer made of the lithium-containing composite nitride represented by $Li_{2.0}Na_{0.6}Co_{0.4}N$ (Example 9), and a negative electrode material having a surface layer made of the lithium-containing composite nitride represented by $Li_{1.8}Na_{0.8}Co_{0.4}N$ (Example 10). Also obtained was a negative electrode material having a surface layer made of the lithium-containing composite nitride represented by $Li_{1.6}Na_{1.0}Co_{0.4}N$ (Comparative Example 3).

The coating area and the thickness of the surface layer of each sample were measured by an electron spectroscopy for chemical analysis (ESCA), an electron probe microanalysis (EPMA), a scanning electron microscopy (SEM) and the like. As a result, the coating area was about 80% of the entire surface area and the thickness of the surface layer was about 0.3 μm, for all the samples.

Coin-type test cells shown in FIG. 1 were then produced using the respective negative electrode materials, and the electrochemical properties such as the recovery property after overdischarge were evaluated in the same manner as in Example 1. The results are shown in Table 2. The results of Comparative Example 1 having no surface layer were also shown in Table 2.

TABLE 2

| Negative electrode material | y | Capacity recovery rate (%) | Thickness before overdischarge (mm) | Thickness after overdischarge (mm) |
|---|---|---|---|---|
| Ex. 6 | 0.005 | 62 | 1.61 | 1.83 |
| Ex. 7 | 0.01 | 75 | 1.60 | 1.66 |
| Ex. 8 | 0.1 | 84 | 1.60 | 1.65 |
| Ex. 9 | 0.6 | 83 | 1.60 | 1.65 |
| Ex. 10 | 0.8 | 77 | 1.61 | 1.70 |
| Com. Ex. 1 | 0.0 | 42 | 1.60 | 2.20 |
| Com. Ex. 3 | 1.0 | 55 | 1.60 | 1.90 |

As is found from Table 2, the negative electrode materials coated with an alkaline metal-added lithium-containing composite nitride also exhibits capacity recovery properties superior to those of the conventional lithium-containing composite nitrides.

EXAMPLES 11 TO 15

The recovery property was compared among negative electrode materials including a core particle made of $Li_{2.6}Co_{0.4}N$ coated with a surface layer made of $Li_{2.5}Na_{0.1}Co_{0.4}N$ in varying coating proportions. The coating with the surface layer was performed in the same manner as in Example 6, and electrodes and test cells were produced in the same manner as in Example 1. The coating proportion was adjusted by changing the conditions of the coating by the mechano-fusion method. The coating proportions were 15% (Example 11), 20% (Example 12), 50% (Example 13), 80% (Example 14) and 100% (Example 15), of the entire surface area. The evaluation results are shown in Table 3. The results of Comparative Example 1 having no surface layer are also shown in Table 3.

TABLE 3

| Negative electrode material | Coating proportion (%) | Capacity recovery rate (%) | Thickness before overdischarge (mm) | Thickness after overdischarge (mm) |
|---|---|---|---|---|
| Ex. 11 | 15 | 48 | 1.60 | 2.10 |
| Ex. 12 | 20 | 60 | 1.60 | 1.82 |
| Ex. 13 | 50 | 68 | 1.60 | 1.73 |
| Ex. 14 | 80 | 83 | 1.61 | 1.65 |
| Ex. 15 | 100 | 85 | 1.61 | 1.66 |
| Com. Ex. 1 | 0 | 42 | 1.60 | 2.20 |

Improvement in property is recognized to some extent in the cell of Example 11 having a coating area of 15% compared with the cell of Comparative Example 1 with no coating, but this is insufficient. On the contrary, significant improvement in property is recognized in the cells having a coating area of 20% or more. In particular, the property is excellent in the cells having the coating area of 80% or more.

EXAMPLES 16 TO 19

The recovery property was compared among negative electrode materials including a core particle made of $Li_{2.6}Co_{0.4}N$ coated with a surface layer made of $Li_{2.5}Na_{0.1}Co_{0.4}N$ in varying thicknesses. The coating with the surface layer was performed in the same manner as in Example 6, and electrodes and test cells were produced in the same manner as in Example 1. The coating thickness was adjusted by changing the conditions of the coating by the mechano-fusion method, and measured by an electron spectroscopy for chemical analysis (ESCA), a scanning electron microscopy (SEM) and the like. The coating thicknesses were 0.005 μm (Example 16), 0.01 μm (Example 17), 0.1 μm (Example 18) and 1 μm (Example 19). The evaluation results are shown in Table 4. The results of Comparative Example 1 having no surface layer are also shown in Table 4.

TABLE 4

| Negative electrode material | Coating thickness (μm) | Capacity recovery rate (%) | Thickness before overdischarge (mm) | Thickness after overdischarge (mm) |
|---|---|---|---|---|
| Ex. 16 | 0.005 | 53 | 1.61 | 1.95 |
| Ex. 17 | 0.01 | 67 | 1.60 | 1.72 |
| Ex. 18 | 0.1 | 79 | 1.60 | 1.69 |
| Ex. 19 | 1.0 | 83 | 1.60 | 1.65 |
| Com. Ex. 1 | 0 | 42 | 1.60 | 2.20 |

As is found from Table 4, improvement in property is recognized to some extent in the cell of Example 16 having a coating thickness of 0.005 μm compared with the cell of Comparative Example 1 with no coating, but this is insufficient. On the contrary, significant improvement in property is recognized in the cells having a coating thickness of 0.01 μm or more. When the thickness exceeds the above value, the results are the same as those in Example 1.

EXAMPLES 20 TO 24

Negative electrode materials were synthesized by mixing a lithium-containing composite nitride represented by $Li_{2.6}Co_{0.4}N$ to be a core particle with potassium nitride ($K_3N$) to obtain a mixture and re-baking the mixture. Using the resultant negative electrode materials, electrodes and test cells were produced and evaluated in the same manner as in Example 1. The added amount of $K_3N$ was adjusted so that potassium (K) was incorporated in a portion of each particle deep by 0.1 μm from the surface and the composition of the surface layer was substantially $Li_{2.5}K_{0.1}CO_{0.4}N$ as measured with XPS and the like, which was the condition selected among various conditions examined. The re-baking temperatures were set at 350° C. (Example 20), 450° C. (Example 21), 500° C. (Example 22), 700° C. (Example 23) and 800° C. (Example 24). The results are shown in Table 5. The results of Comparative Example 1 are also shown in Table 5.

TABLE 5

| Negative electrode material | Re-baking temp. (° C.) | Capacity recovery rate (%) | Thickness before overdischarge (mm) | Thickness after overdischarge (mm) |
|---|---|---|---|---|
| Ex. 20 | 350 | — | — | — |
| Ex. 21 | 450 | 80 | 1.60 | 1.66 |

TABLE 5-continued

| Negative electrode material | Re-baking temp. (° C.) | Capacity recovery rate (%) | Thickness before overdischarge (mm) | Thickness after overdischarge (mm) |
|---|---|---|---|---|
| Ex. 22 | 500 | 82 | 1.60 | 1.65 |
| Ex. 23 | 700 | 85 | 1.60 | 1.65 |
| Ex. 24 | 800 | 84 | 1.61 | 1.66 |
| Com. Ex. 1 | — | 42 | 1.60 | 2.20 |

In Example 20, the negative electrode material could not be synthesized. As is found from Table 5, although potassium (K) is not dissolved sufficiently at 350° C. failing to synthesize a desired active material, active materials in accordance with the present invention synthesized at 450° C. or more exhibit excellent capacity recovery properties after overdischarge.

For Examples 6 to 24, also, tests similar to those described above were performed by varying the type and mole fraction of the alkaline metal added, or the type and mole fraction of the transition metal in the surface layers and the core particles. As a result, in all the tests, the recovery property after overdischarge improved by use of negative electrode materials in accordance with the present invention.

EXAMPLES 25 TO 38 AND COMPARATIVE EXAMPLE 4

The overdischarge recovery property was compared among lithium-containing composite nitrides with an alkaline earth metal (Mg, Ca) in varying added amounts.

First, lithium-containing composite nitrides in accordance with the present invention were synthesized in the following manner. In these examples, Co was used as the transition metal. Synthesis was also possible using any of the other transition metals specified hereinbefore. As the starting materials, powder of lithium nitride ($Li_3N$), Co powder and powder of magnesium nitride ($Mg_3N_2$) as an alkaline earth metal source were used. These powders were mixed sufficiently at ratios of Li/Mg/Co in mole fractions of 2.60–Y:Y:0.40 wherein Y=0, 0.01, 0.05, 0.10, 0.15, 0.19, 0.20 and 0.21. The resultant mixtures were put in a crucible and baked in a high-purity (99.9% or more) nitrogen atmosphere at 700° C. for eight hours, to obtain lithium-containing composite nitride powders (negative electrode materials) represented by $Li_{2.6}Co_{0.4}N$ (Comparative Example 4), $Li_{2.59}Mg_{0.01}Co_{0.4}N$ (Example 25), $Li_{2.55}Mg_{0.05}Co_{0.4}N$ (Example 26), $Li_{2.5}Mg_{0.1}Co_{0.4}N$ (Example 27), $Li_{2.45}Mg_{0.15}Co_{0.4}N$ (Example 28), $Li_{2.41}Mg_{0.19}Co_{0.4}N$ (Example 29), $Li_{2.4}Mg_{0.2}Co_{0.4}N$ (Example 30) and $Li_{2.39}Mg_{0.21}Co_{0.4}N$ (Example 31).

The synthesis was performed in a high-purity nitrogen atmosphere (oxygen concentration: 100 ppm or less) with a low-humidity (dew point: −20° C. or less).

Synthesis was also performed using calcium nitride ($Ca_3N_2$) powder as the alkaline earth metal source under substantially the same conditions as those described above. In this case, the powders were mixed at ratios of Li/Ca/Co in mole fractions of 2.60−Y:Y:0.40 wherein Y=0.01, 0.05, 0.10, 0.15, 0.19, 0.20 and 0.21, to obtain lithium-containing composite nitride powders (negative electrode materials) represented by $Li_{2.59}Ca_{0.01}Co_{0.4}N$ (Example 32), $Li_{2.55}Ca_{0.05}Co_{0.4}N$ (Example 33), $Li_{2.5}Ca_{0.1}Co_{0.4}N$ (Example 34), $Li_{2.45}Ca_{0.15}Co_{0.4}N$ (Example 35), $Li_{2.41}Ca_{0.19}Co_{0.4}N$ (Example 36), $Li_{2.4}Ca_{0.2}Co_{0.4}N$ (Example 37) and $Li_{2.39}Ca_{0.21}Co_{0.4}N$ (Example 38).

As a conventional example having no alkaline earth metal added thereto, a lithium-containing composite nitride powder represented by $Li_{2.6}Co_{0.4}N$ (Comparative Example 4) was obtained by mixing lithium and cobalt at a ratio of mole fractions of 2.60:0.40.

The thus-obtained lithium-containing composite nitrides were subjected to powder X-ray diffraction measurement. As a result, a hexagonal pattern was observed and attainment of a single phase with no impurity peak was confirmed, for the compositions where Y is 0.20 or less in both Mg and Ca cases. In case of Y=0.21, however, an impurity phase was recognized failing to provide a single phase.

Coin-type cells shown in FIG. 1 were produced using the thus-prepared single-phase materials, and the recovery properties after overdischarge of the cells were evaluated. First, the lithium-containing composite nitride powder, synthetic graphite (KS-6) as a conductive material and polytetrafluoroethylene as a binder were mixed together at a predetermined ratio, and the mixture was formed on a current collector 12 placed in a case 13 integrally to provide a test electrode 11. The formed test electrode 11 was sufficiently dried under a reduced pressure at 80° C. Thereafter, a porous polyethylene sheet was placed over the test electrode 11 as a separator 17, and then the case was filled with a solution of 1 M lithium hexafluorophosphate dissolved in a 1:1 mixed solvent of ethylene carbonate and diethylcarbonate as the electrolyte. A cover plate 16, having a current collector 15 placed thereon and lithium foil 14 as a counter electrode pressed against the current collector 15, was overlaid on the case. The case was then caulked with a press, to thereby produce a coin-type cell. The mixture ratio by weight among the lithium-containing composite nitride powder, the conductive material and the binder was 100:20:5. The weight of the lithium-containing composite nitride in the test electrode was adjusted to be 25 mg, and the amount of the lithium foil as the counter electrode was set to be sufficiently excessive with respect to the capacity thereof.

Thus-obtained test cells were subjected to charge/discharge at a current density of 0.65 mA/cm$^2$ and a voltage range of 0 to 1.5 V for 10 cycles, and then discharged to 2.0 V and left to stand for one day. Thereafter, the test cells were charged again to 0 V and then discharged to 1.5 V. The ratio of the discharge capacity obtained at this discharge to the discharge capacity obtained at the discharge to 1.5 V in the tenth cycle was calculated as a capacity recovery rate. The results are shown in FIGS. 6 to 9. It is noted that in these examples, the discharge refers to the state where Li is deintercalated from the test electrode, and the charge refers to the state where Li is intercalated into the test electrode. That is, the expression of charge/discharge was used to correspond to the charge/discharge behavior observed when the test electrode was used as the negative electrode.

Figure 6:
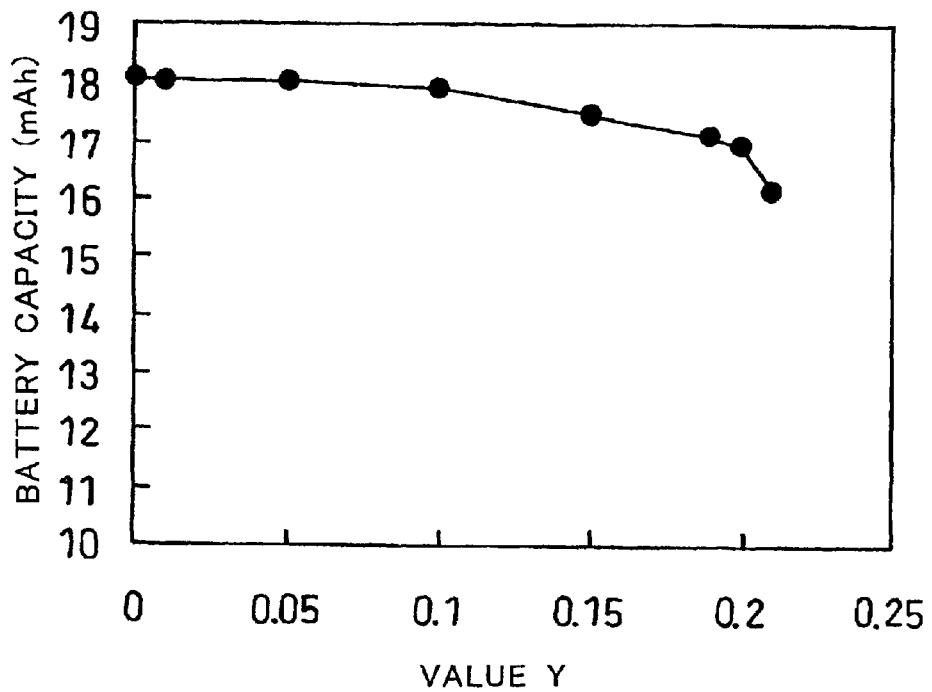
FIG. 6 is a graph showing the relation between Y in the composition of a negative electrode material of the present invention and the capacity of a battery produced using the material.
Figure 7:
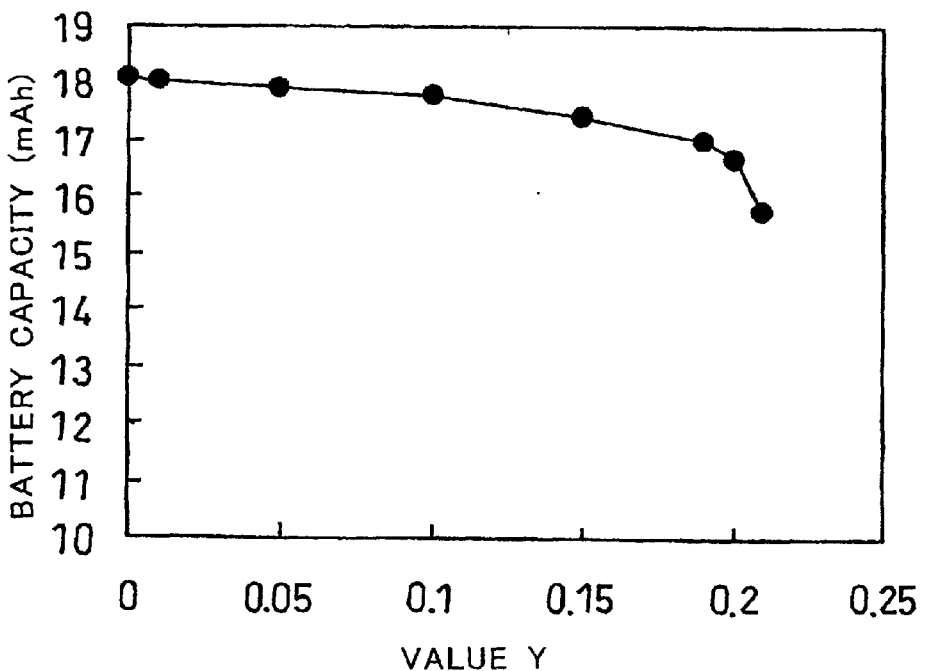
FIG. 7 is a graph showing the relation between Y in the composition of a negative electrode material of the present invention and the capacity of a battery produced using the material.
Figure 8:
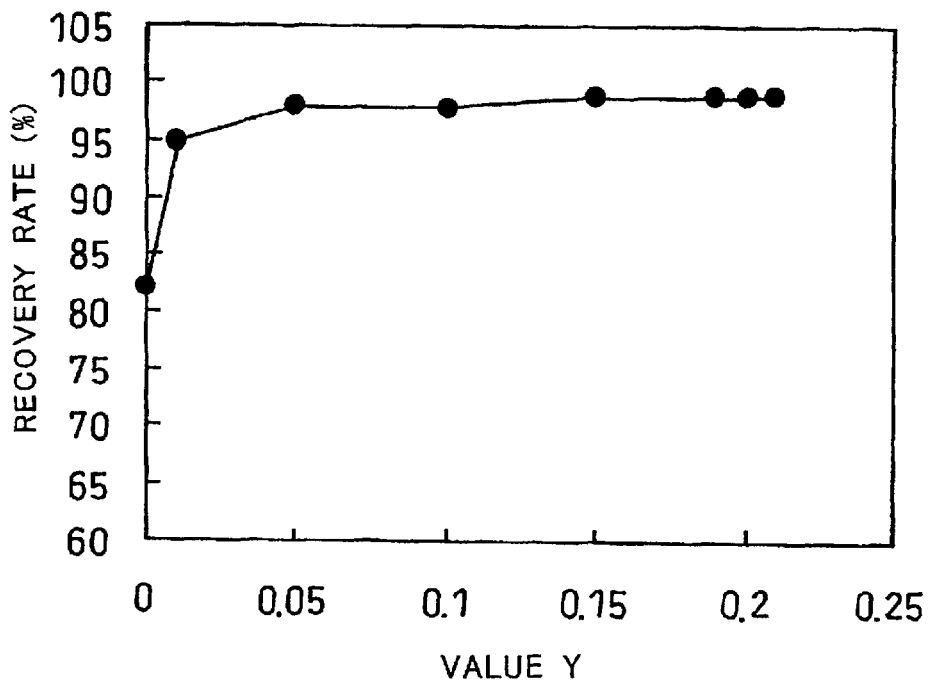
FIG. 8 is a graph showing the relation between Y in the composition of a negative electrode material of the present invention and the recovery rate of the battery produced using the material.
Figure 9:
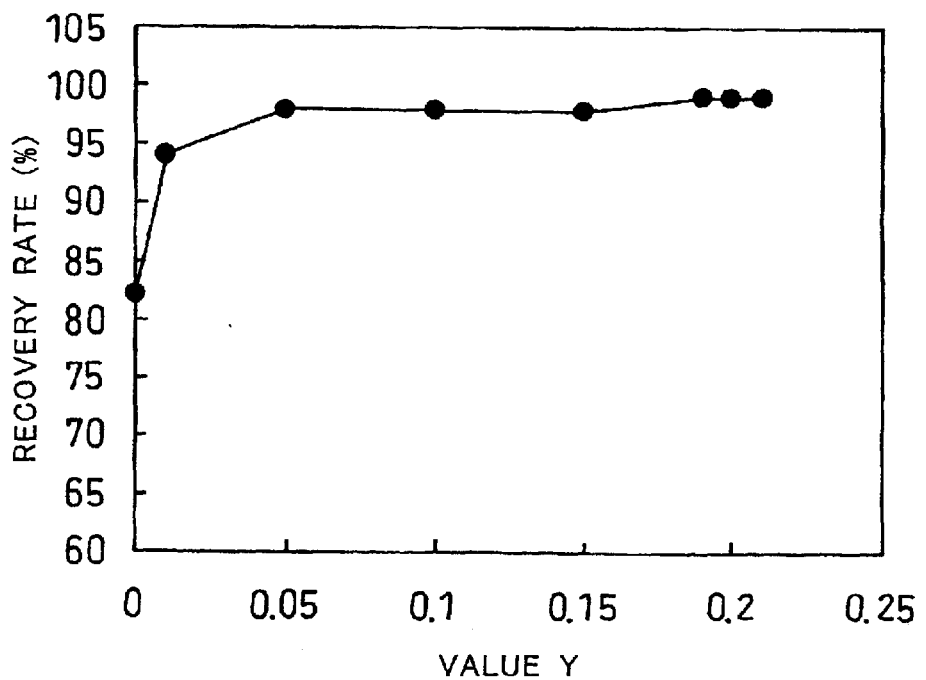
FIG. 9 is a graph showing the relation between Y in the composition of a negative electrode material of the present invention and the capacity of the battery produced using the material.

As shown in FIGS. 6 and 7, large decrease in capacity is observed when the mole fraction Y of the alkaline earth metal exceeds 0.20 in both the Mg and Ca addition cases. It is presumed that deterioration in properties occurred due to generation of an impurity. As shown in FIGS. 8 and 9, the capacity recovery rate after overdischarge to 2.0 V improved compared with the conventional cases having no alkaline earth metal added thereto.

The case of using both Mg and Ca as the alkaline earth metal was also examined, and substantially the same results were obtained.

EXAMPLES 39 TO 46 AND COMPARATIVE EXAMPLES 5 TO 8

In these examples, the mole fraction of Co as the transition metal was varied.

Lithium-containing composite nitrides were synthesized as in Example 25 so that the mixing ratios among lithium, magnesium and cobalt (Li/Mg/Co) in mole fractions were 2.95−X:0.05:X wherein X=0.15, 0.20, 0.40, 0.60, 0.80 and 0.85, and so that the mixing ratios among lithium, calcium and cobalt (Li/Ca/Co) in mole fractions were 2.95−X:0.05:X wherein X=0.15, 0.20, 0.40, 0.60, 0.80 and 0.85, to obtain $Li_{2.80}Mg_{0.05}Co_{0.15}N$ (Comparative Example 5), $Li_{2.75}Mg_{0.05}Co_{0.20}N$ (Example 39), $Li_{2.55}Mg_{0.05}Co_{0.4}N$ (Example 40), $Li_{2.35}Mg_{0.05}Co_{0.60}N$ (Example 41), $Li_{2.15}Mg_{0.05}Co_{0.80}N$ (Example 42) and $Li_{2.10}Mg_{0.05}Co_{0.85}N$ (Comparative Example 6), and $Li_{2.80}Ca_{0.05}Co_{0.15}N$ (Comparative Example 7), $Li_{2.75}Ca_{0.05}Co_{0.20}N$ (Example 43), $Li_{2.55}Ca_{0.05}Co_{0.4}N$ (Example 44), $Li_{2.35}Ca_{0.05}Co_{0.60}N$ (Example 45), $Li_{2.15}Ca_{0.05}Co_{0.80}N$ (Example 46) and $Li_{2.10}Ca_{0.05}Co_{0.85}N$ (Comparative Example 8).

The thus-obtained lithium-containing composite nitrides were subjected to powder X-ray diffraction measurement. As a result, a hexagonal pattern was observed and attainment of a single phase with no impurity peak was confirmed, for the compositions where X is 0.80 or less in both Mg and Ca cases. In case of X=0.85, however, an impurity phase was recognized failing to provide a single phase.

Coin-type cells were produced using the thus-prepared single-phase materials as in Example 25, and the recovery properties after overdischarge of the cells were evaluated. The results are shown in FIGS. 10 to 13.

Figure 10:
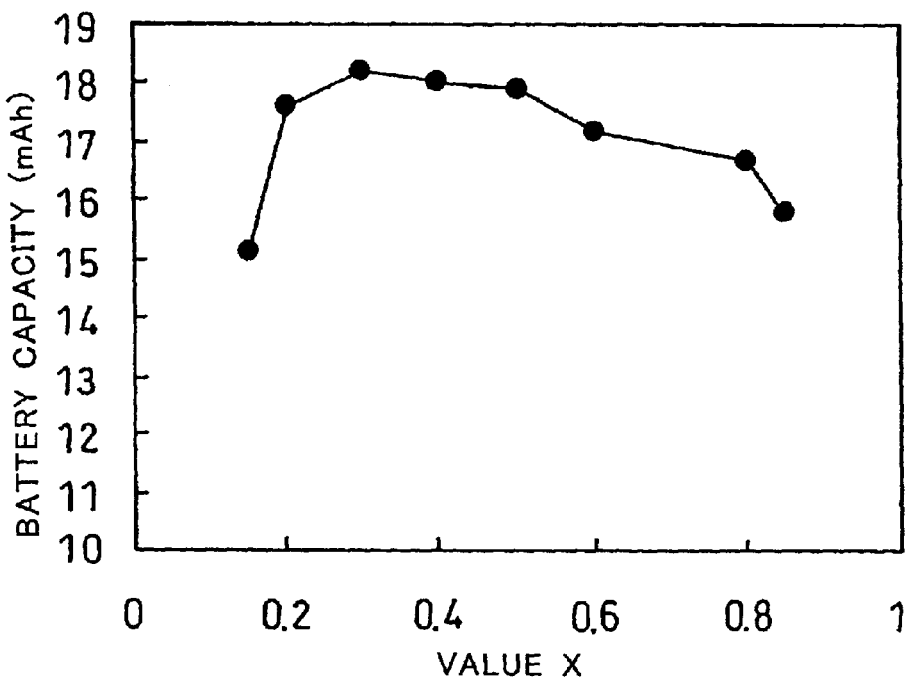
FIG. 10 is a graph showing the relation between X in the composition of a negative electrode material of the present invention and the capacity of a battery produced using the material.
Figure 11:
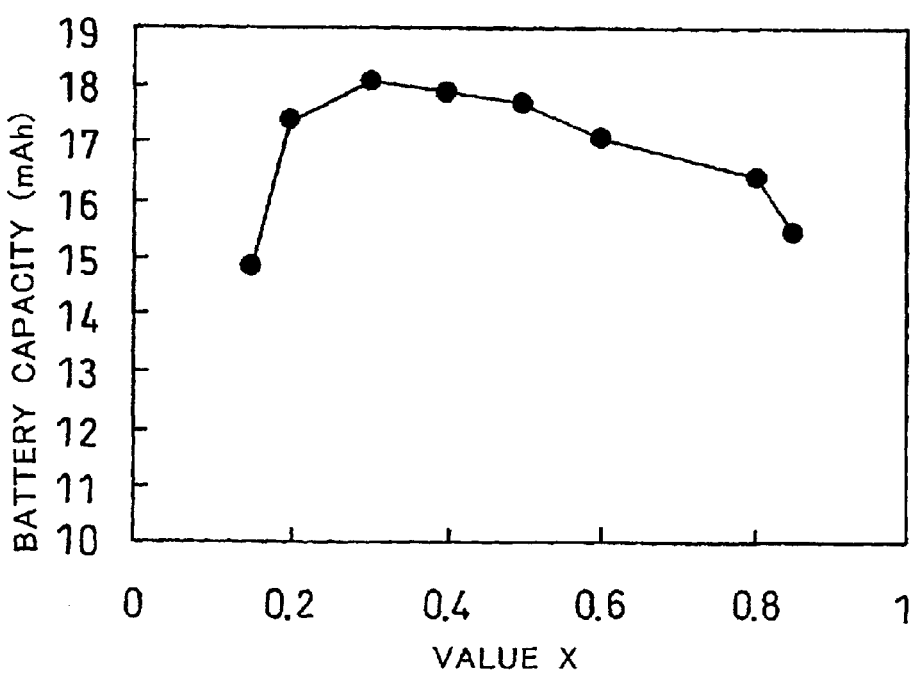
FIG. 11 is a graph showing the relation between X in the composition of a negative electrode material of the present invention and the capacity of a battery produced using the material.
Figure 12:
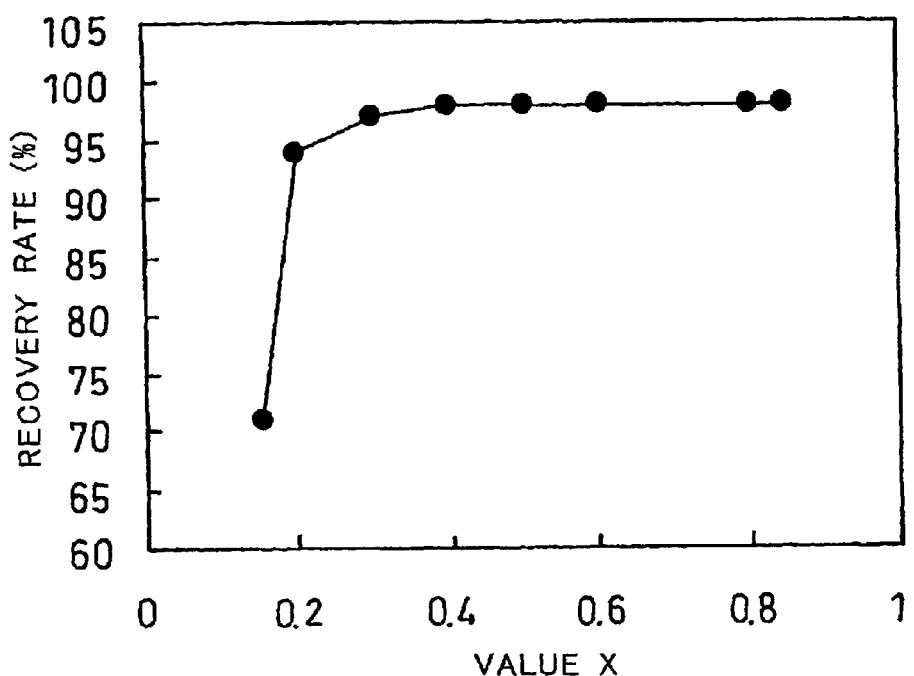
FIG. 12 is a graph showing the relation between X in the composition of a negative electrode material of the present invention and the recovery rate of a battery produced using the material.
Figure 13:
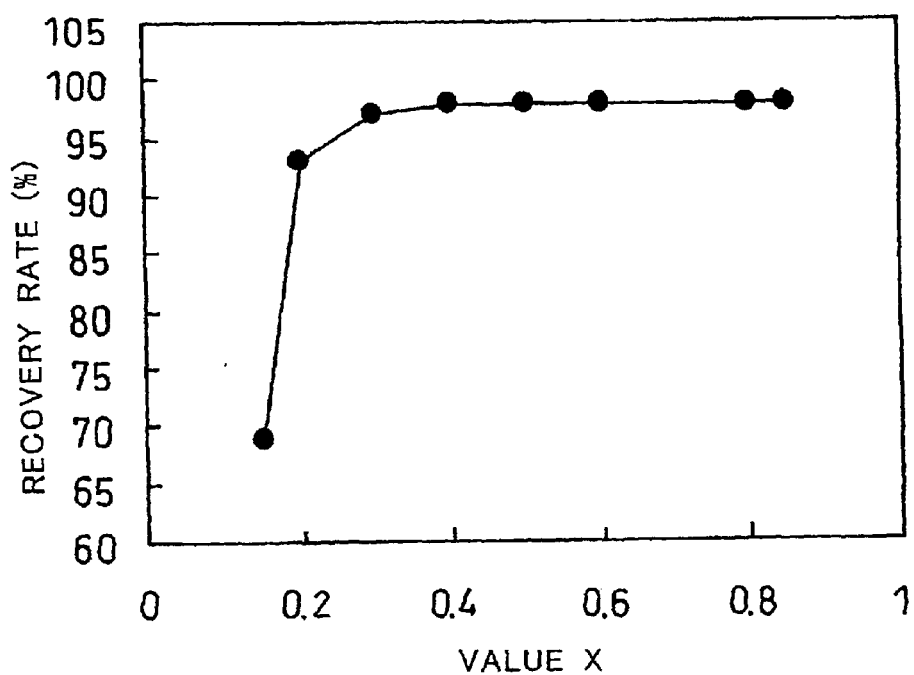
FIG. 13 is a graph showing the relation between X in the composition of a negative electrode material of the present invention and the recovery rate of a battery produced using the material.

As shown in FIGS. 10 and 11, large decrease in capacity is observed when the Co mole fraction X is less than 0.20 or exceeds 0.80. As shown in FIGS. 12 and 13, the capacity recovery rate after the overdischarge to 2.0 V improved in both the Mg and Ca addition cases when the Co mole fraction was 0.20 or more. In case of X=0.15, the Co amount was presumably too small to provide a sufficient property. In case of X=0.85, the capacity was insufficient, in addition to the failure to attain a single phase.

In the above examples, Co was used as the transition metal. Substantially the same effect was also obtained by using any of the other transition metals specified hereinbefore. The coin-type cells were used for the tests in these examples. Substantially the same effect was also obtained in tests with cylindrical cells and laminated cells using a polymer electrolyte.

In accordance with the present invention, by using a lithium-containing composite nitride with an alkaline metal added thereto as the negative electrode active material, the capacity recovery property after overdischarge of a battery can be improved. Thus, it is possible to provide negative electrode materials for nonaqueous electrolyte secondary batteries with large capacity and high reliability.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A negative electrode material for a nonaqueous electrolyte secondary battery, comprising a lithium-containing composite nitride represented by the formula (1):

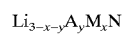

$$Li_{3-x-y}A_yM_xN$$

wherein A is at least one selected from the group consisting of alkaline metals, except for lithium, and alkaline earth metals, M is a transition metal, $0.2 \leq x \leq 0.8$ and $0.0 < y \leq 0.8$; and wherein the negative electrode material comprises core particles made of a lithium-containing composite nitride represented by the formula (2):

$$Li_{3-x}M_xN$$

wherein M is a transition metal and $0.2 \leq x \leq 0.8$, and surface layers made of the lithium-containing composite nitride represented by the formula (1) cover said respective core particles.

2. A nonaqueous electrolyte secondary battery using a negative electrode material comprising a lithium-containing composite nitride represented by the formula (1):

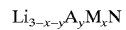

$$Li_{3-x-y}A_yM_xN$$

wherein A is at least one selected from the group consisting of alkaline metals, except for lithium, and alkaline earth metals, M is a transition metal $0.2 \leq x \leq 0.8$ and $0.0 < y \leq 0.8$; and wherein the negative electrode material comprises core particles made of a lithium-containing composite nitride represented by the formula (2):

$$Li_{3-x}M_xN$$

wherein M is a transition metal and $0.2 \leq x \leq 0.8$, and surface layers made of the lithium-containing composite nitride represented by the formula (1) cover said respective core particles.

* * * * *